United States Patent
Tsay

(10) Patent No.: US 11,165,454 B1
(45) Date of Patent: Nov. 2, 2021

(54) RADIO WITH AUTOMATIC BANDWIDTH ADJUSTING FUNCTIONS AND AUTOMATIC BANDWIDTH ADJUSTING METHOD

(71) Applicant: SANGEAN ELECTRONICS INC., New Taipei (TW)

(72) Inventor: Yeu Shuh Tsay, New Taipei (TW)

(73) Assignee: SANGEAN ELECTRONICS INC., New Taipei (TW)

( * ) Notice: Subject to any disclaimer, the term of this patent is extended or adjusted under 35 U.S.C. 154(b) by 0 days.

(21) Appl. No.: 17/063,934

(22) Filed: Oct. 6, 2020

(30) Foreign Application Priority Data

Jul. 30, 2020 (TW) .................................. 109125695

(51) Int. Cl.
*H04B 1/10* (2006.01)
*H04B 1/16* (2006.01)

(52) U.S. Cl.
CPC ................. *H04B 1/10* (2013.01); *H04B 1/16* (2013.01)

(58) Field of Classification Search
CPC ...... H04B 1/10; H04B 1/1027; H04B 1/1036; H04B 1/1054; H04B 17/318; H04B 1/001; H04B 1/0475; H04B 1/109; H04B 1/16; H04B 1/1646; H04B 1/3827; H04B 17/00; H04B 17/20; H04W 52/241; H04W 52/243; H04W 52/245; H04W 52/367; H04W 72/085; H04H 40/18; H04H 40/45; H04H 40/72

See application file for complete search history.

(56) References Cited

U.S. PATENT DOCUMENTS

| | | | | |
|---|---|---|---|---|
| 7,903,763 | B2 * | 3/2011 | Andrle | H04B 1/1027 |
| | | | | 375/324 |
| 8,116,713 | B2 * | 2/2012 | Whikehart | H04B 1/1036 |
| | | | | 455/266 |
| 9,467,113 | B2 * | 10/2016 | Nikitin | H03H 11/1256 |
| 10,393,787 | B2 * | 8/2019 | Fujishima | H04B 17/336 |
| 10,651,878 | B2 * | 5/2020 | Gnann | H04B 1/1036 |
| 10,862,519 | B1 * | 12/2020 | Keukens | H04B 1/1036 |

* cited by examiner

*Primary Examiner* — Quochien B Vuong
(74) *Attorney, Agent, or Firm* — Karin L. Williams; Alan D. Kamrath; Mayer & Williams PC

(57) ABSTRACT

The present invention relates to an automatic bandwidth adjusting method comprising steps of receiving at least one radio signal, converting the at least one radio signal in a preset filter bandwidth into at least one audio signal; generating at least one signal-to-noise ratio (SNR) information based on the at least one audio signal, wherein the filter bandwidth is adjusted between multiple preset range intervals, and the range intervals are different; comparing the at least one SNR information with a preset first critical SNR and a preset second critical SNR to determine whether to adjust the filter bandwidth or not; outputting a bandwidth adjustment signal when the filter bandwidth needs to be adjusted; and adjusting the filter bandwidth according to the bandwidth adjustment signal.

10 Claims, 4 Drawing Sheets

RADIO WITH AUTOMATIC BANDWIDTH ADJUSTING FUNCTIONS AND AUTOMATIC BANDWIDTH ADJUSTING METHOD

BACKGROUND OF THE INVENTION

1. Field of the Invention

The present invention relates to a radio with bandwidth adjusting functions and a bandwidth adjusting method, particularly to a radio with automatic bandwidth adjusting functions and an automatic bandwidth adjusting method.

2. Description of the Prior Art

Bandwidth is a frequency difference between an upper frequency and a lower frequency of a frequency band channel through which signals can pass, and bandwidth is typically measured in hertz (HZ). Only the frequency of the signal within the bandwidth can pass. Therefore, the amount of noise of the signal is closely related to the bandwidth. Take the audio signal for an example. The narrower the bandwidth is, the smaller the range of frequency that the audio signal can pass and be received is. In this way, the noise with a frequency different from the audio signal will not pass and be filtered out, thus lessening the noise interference of the audio signal. However, the high-frequency of the audio signal whose frequency is not within the bandwidth will be filtered out due to the limitation of the bandwidth. When the bandwidth is wider, the range of the frequency that the audio signal can pass through is larger. The noise with a frequency different from the audio signal can also pass. Therefore, the noise interference of the audio signal is the greater, but the high-frequency of the audio signal will not be restricted by the bandwidth.

A bandwidth of a common radio can be manually adjusted by a user. The radio receives the radio signal within the bandwidth, and generates an audio signal which corresponds to the radio signal. When the radio signal becomes weaker, the noise in the background will become more obvious. Therefore, the user can manually adjust the bandwidth of the radio to a narrow the bandwidth to filter out the noise generated by high-frequency noise. When the radio signal becomes stronger, the noise in the background will become less obvious. Therefore, the user can manually adjust the bandwidth of the radio to a wider bandwidth to improve the clarity of the audio signal.

However, the sound sensitivity of everyone is different. The manually-adjusted bandwidth is judged by individual users. It is easy to adjust the bandwidth to too narrow or too wide, which will affect the listening quality of the users. On the other hand, the quality of the radio signal is easily affected by environmental factors. The strength of the radio signal may fluctuate continuously. In order to maintain a certain radio quality, the user needs to adjust the bandwidth to an appropriate range from time to time, which causes inconvenience to the user.

SUMMARY OF THE INVENTION

An objective of the present invention is to overcome the defect of manually adjusting bandwidth and to enhance the convenience of bandwidth adjustment. The present invention provides a radio with automatic bandwidth adjusting functions. The radio with automatic bandwidth adjusting functions includes an antenna, an audio processing module, and a player. The antenna receives at least one radio signal.

The audio processing module is electrically connected to the antenna, and presets multiple range intervals, a filter bandwidth, a first critical signal-to-noise ratio (SNR), and a second critical SNR, wherein the range intervals are different from each other. The filter bandwidth is adjusted between the range intervals. The player is electrically connected to the audio processing module.

Furthermore, the audio processing module converts the at least one radio signal whose frequency is within the filter bandwidth into at least one audio signal, and generates at least one SNR information according to the at least one audio signal. The player generates sound according to the at least one audio signal.

The audio processing module further compares the at least one SNR information with the first critical SNR and the second critical SNR, and determines whether to adjust the filter bandwidth or not. When the audio processing module determines the filter bandwidth needs to be adjusted, the audio processing module generates a bandwidth adjustment signal. The audio processing module further adjusts the filter bandwidth according to the bandwidth adjustment signal.

Another objective of the present invention is to provide an automatic bandwidth adjusting method. The automatic bandwidth adjusting method comprises steps of:

receiving at least one radio signal;

converting the at least one radio signal in a preset filter bandwidth into at least one audio signal;

generating at least one SNR information based on the at least one audio signal; wherein the filter bandwidth is adjusted between multiple preset range intervals, and the range intervals are different;

comparing the at least one SNR information with a preset first critical SNR and a preset second critical SNR to determine whether to adjust the filter bandwidth or not; wherein the first critical SNR is higher than the second critical SNR;

outputting a bandwidth adjustment signal when the filter bandwidth needs to be adjusted; and adjusting the filter bandwidth according to the bandwidth adjustment signal.

To sum up, the present invention compares the at least one SNR information with the first critical SNR and the second critical SNR, uses the first critical SNR and the second critical SNR as a criterion to judge whether the filter bandwidth needs to be adjusted or not, outputs the bandwidth adjustment signal, and adjusts the filter bandwidth according to the bandwidth adjustment signal. The present invention overcomes the defect of manually adjusting the bandwidth which affects the audio quality and causes inconvenience to the user.

DETAILED DESCRIPTION OF THE INVENTION

Figure 1:
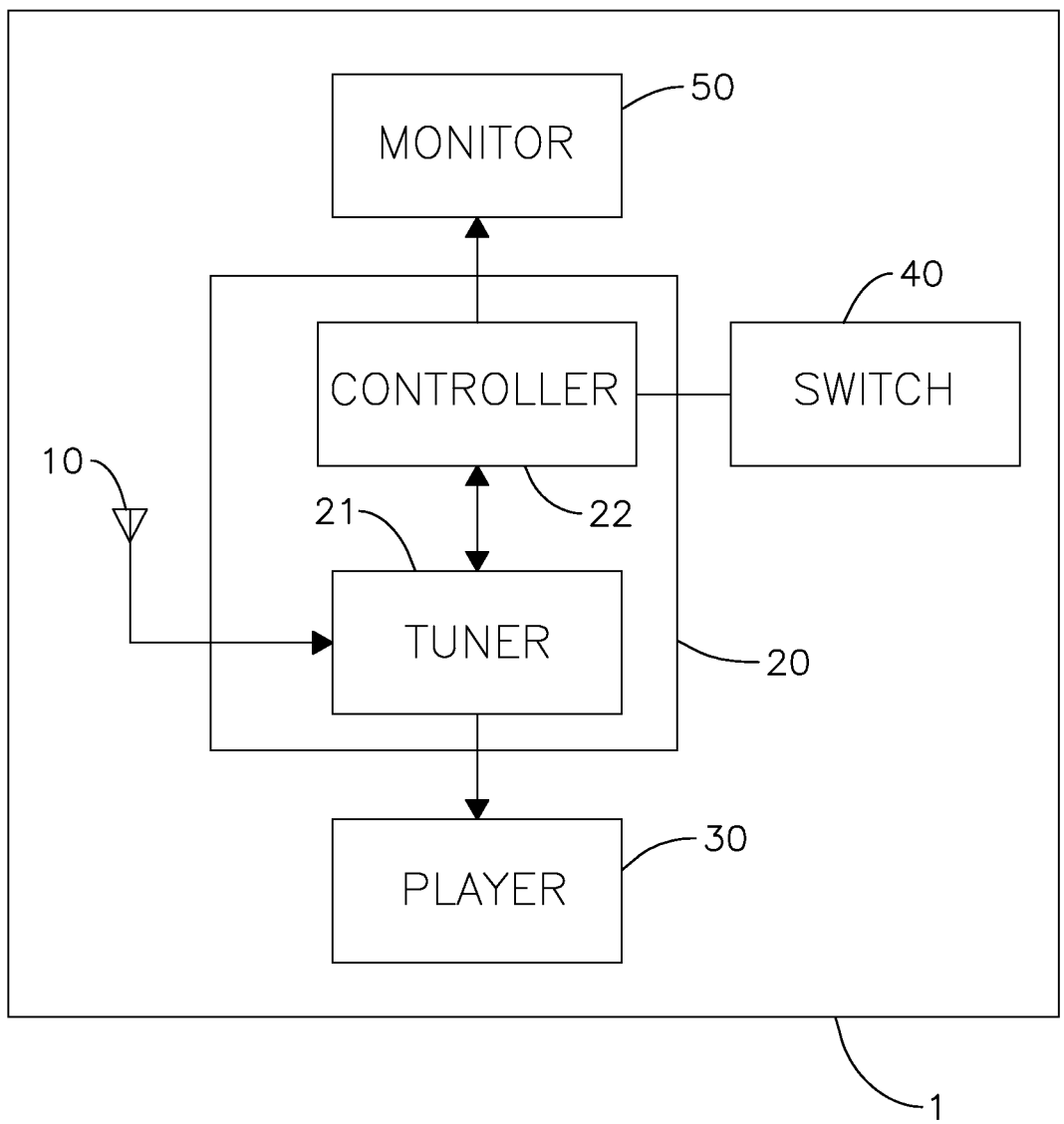
FIG. 1 is a block diagram of a radio with automatic bandwidth adjusting functions of the present invention.
Figure 2A:
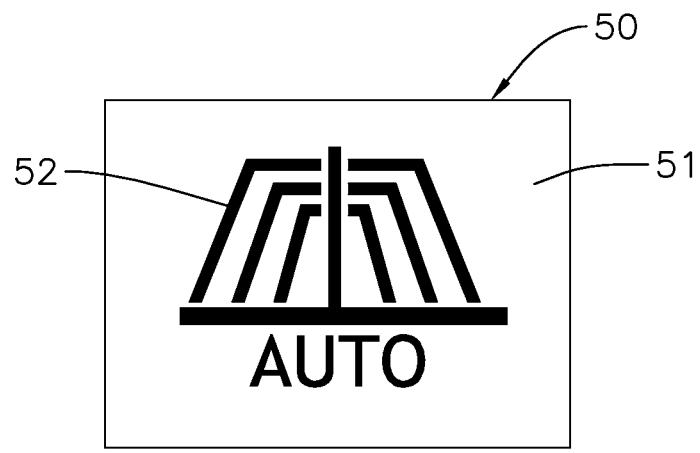
FIG. 2A is a display schematic diagram of a monitor of the radio with automatic bandwidth adjusting functions of the present invention.
Figure 2B:
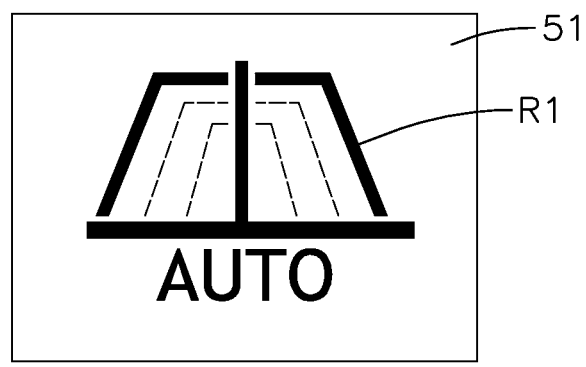
FIG. 2B is a schematic diagram of a first range interval of the radio with automatic bandwidth adjusting functions of the present invention.
Figure 2C:
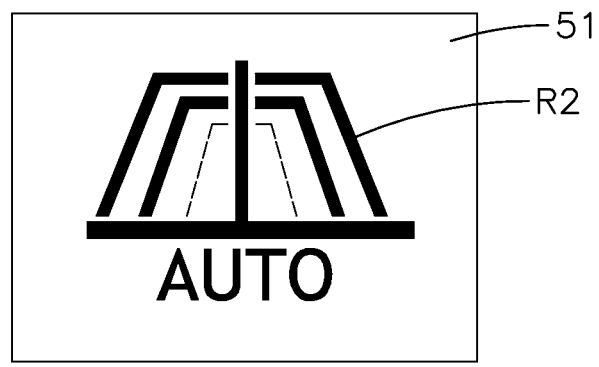
FIG. 2C is a schematic diagram of a second range interval of the radio with automatic bandwidth adjusting functions of the present invention.
Figure 2D:
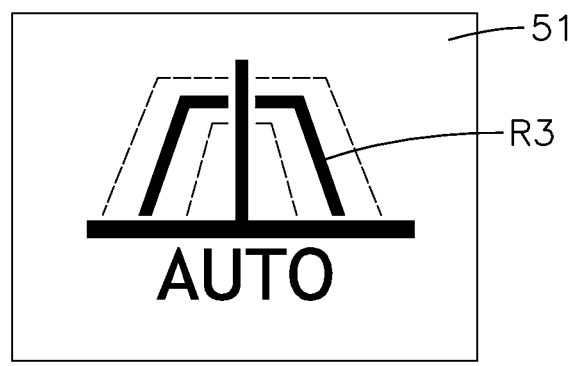
FIG. 2D is a schematic diagram of a third range interval of the radio with automatic bandwidth adjusting functions of the present invention.
Figure 2E:
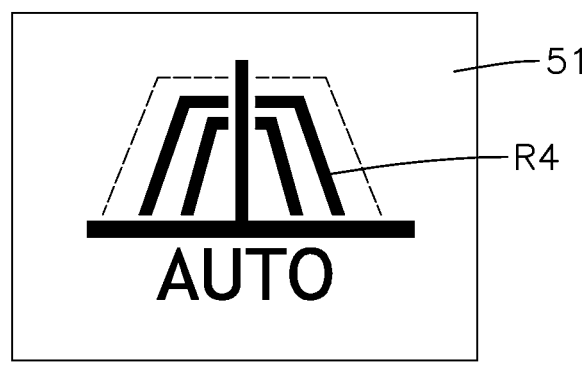
FIG. 2E is a schematic diagram of a fourth range interval of the radio with automatic bandwidth adjusting functions of the present invention.
Figure 2F:
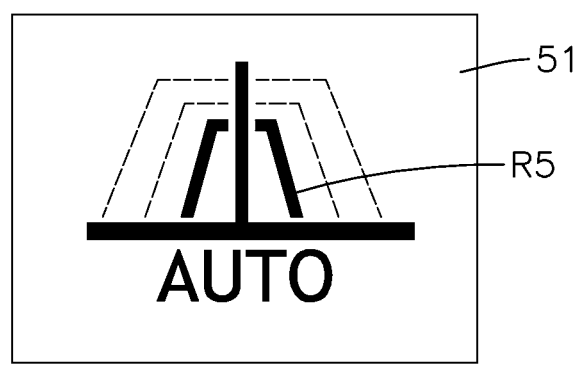
FIG. 2F is a schematic diagram of a fifth range interval of the radio with automatic bandwidth adjusting functions of the present invention.

With reference to FIG. 1, the present invention provides a radio 1 with automatic bandwidth adjusting functions and an automatic bandwidth adjusting method. The radio 1 includes an antenna 10, an audio processing module 20, and a player 30. The antenna 10 receives at least one radio signal. The antenna 10 also can receive the radio signals coming from different bands, such as long-wave band, medium-wave band, short-wave band, frequency modulation band, and air band. The audio processing module 20 is electrically connected to the antenna 10. The player 30 is electrically connected to the audio processing module 20.

The audio processing module 20 comprises a tuner 21 and a controller 22. The tuner 21 is electrically connected to the antenna 10, and a software of the tuner 21 presets multiple range intervals and a filter bandwidth. The multiple range intervals are different. The tuner 21 can preset different numbers of the multiple range intervals corresponding to different bands, and the filter bandwidth can be adjusted between the range intervals. The tuner 21 can filter the at least one radio signal received by the antenna 10 within the filter bandwidth. The tuner 21 filters the at least one radio signal according to the filter bandwidth, converts the filtered at least one radio signal whose frequency is within the filter bandwidth into at least one audio signal and outputs the at least one audio signal. The tuner 21 of the audio processing module 20 can be connected to the player 30. The player 30 generates sound according to the at least one audio signal, and the tuner 21 can be a digital signal processing tuner (DSP Tuner) or an intermediate frequency amplifier.

The controller 22 is electrically connected to the tuner 21 and presets a first critical signal-to-noise ratio (SNR) and a second critical SNR. The first critical SNR is greater than the second critical SNR. The controller 22 and the tuner 21 can be connected through the Inter-Integrated Circuit bus (I2C bus) interface to transmit signals. The controller 22 compares at least one SNR information of the at least one audio signal with the preset first critical SNR and the preset second critical SNR to determine whether to adjust the filter bandwidth or not. Furthermore, the at least one SNR information can be calculated by the tuner 21 or the controller 22 according to the at least one audio signal. The controller 22 obtains at least one SNR of the at least one audio signal according to the at least one SNR information, calculates an average SNR value of the at least one SNR, compares the average SNR value with the first critical SNR and the second critical SNR to determine whether to adjust the filter bandwidth or not. When the controller 22 determine the filter bandwidth needs to be adjusted, the controller 22 outputs a bandwidth adjustment signal to the tuner 21 according to the result of the controller 22. With reference to FIGS. 1 and 2A to 2F, in addition to providing the function of automatically adjusting the bandwidth, the radio 1 with automatic bandwidth adjusting functions can further comprise a switch 40 which is connected to the controller 22. When the switch 40 is turned on, the controller 22 determines whether to adjust the filter bandwidth or not. When the switch 40 is turned off, the controller 22 stops determining whether to adjust the filter bandwidth or not, which means that the user can turn on or turn off the automatic bandwidth adjustment function of the radio by operating the switch 40.

With reference to FIG. 1, the radio 1 with automatic bandwidth adjusting functions can further comprise a monitor 50 which is connected to the controller 22. A display screen 51 of the monitor 50 can display a current range interval of the filter bandwidth. Take the tuner 21 presetting five range intervals as an example. The range intervals include a first range interval R1, a second range interval R2, a third range interval R3, a fourth range interval R4, and a fifth range interval R5. The widths of the first range interval R1 to the fifth range interval R5 are decreased in sequence. For example, the third range interval R3 is regarded as a normal bandwidth. The first range interval R1 is the widest bandwidth, and the second range interval R2 is a bandwidth narrower than the first range interval R1 and wider than the third range interval R3. On the other hand, the fifth range interval R5 is the narrowest bandwidth, and the fourth range interval R4 is a bandwidth narrower than the third range interval R3 and wider than the fifth range interval R5. Moreover, the fifth range interval R5 is located in the fourth range interval R4, the fourth range interval R4 is located in the third range interval R3, the third range interval R3 is located in the second range interval R2, and the second range interval R2 is located in the first range interval R1. In addition, the monitor 50 can display a current range interval 52 on the display screen 51. An icon displayed on the current range interval 52 corresponds to the filter bandwidth. When the filter bandwidth is the first range interval R1, the second range interval R2, the third range interval R3, the fourth range interval R4, or the fifth range interval R5, the monitor 50 shows the corresponding icon. Therefore, the user can identify the current range interval 52 by the displayed icon. Furthermore, the monitor 50 may also display the current range interval by a light signal or a bandwidth value.

Figure 3:
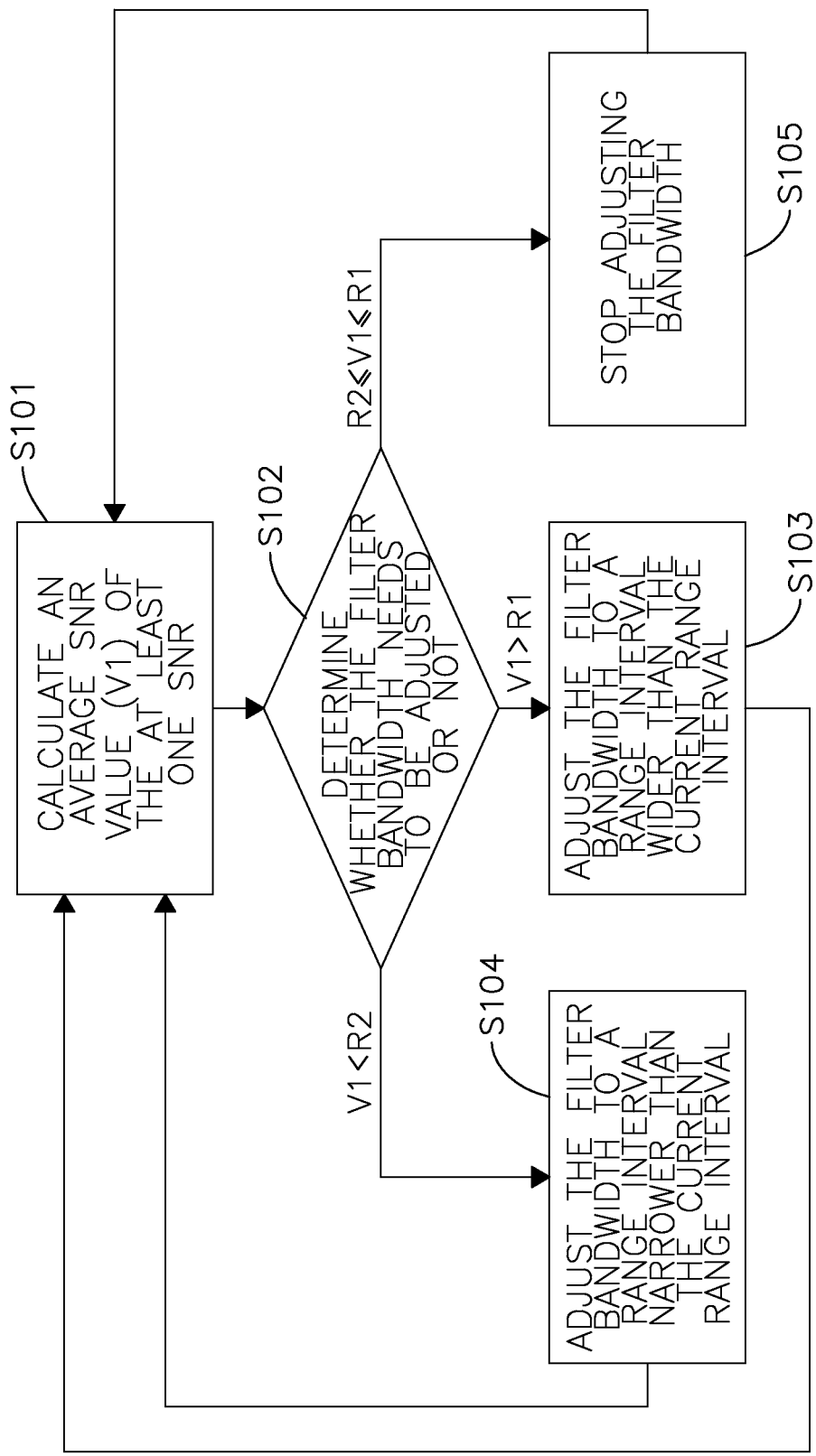
FIG. 3 is a process flow diagram of the controller judging whether the filter bandwidth should be adjusted.

With reference to FIG. 3, the automatic bandwidth adjusting method includes the following steps.

Step 101: Receiving the at least one radio signal, converting the at least one radio signal in a preset filter bandwidth into at least one audio signal, generating the at least one SNR information, obtaining the at least one SNR of the at least one audio signal from the at least one SNR information, and calculating an average SNR value (V1) of the at least one SNR.

Step 102: Comparing the average SNR value (V1) with the first critical SNR (R1) and the second critical SNR (R2) to determine whether the filter bandwidth needs to be adjusted or not.

Step 103: When the average SNR value (V1) is greater than the first critical SNR (R1), it is determined that the width of the filter bandwidth needs to be increased. Therefore, the bandwidth adjustment signal is outputted to adjust the filter bandwidth to a range interval wider than the current range interval. Take the five range intervals as an example. The filter bandwidth is in the third range interval R3, and is regarded as the current range interval. When the average SNR value (V1) is greater than the first critical SNR (R1), the bandwidth adjustment signal is outputted to adjust the filter bandwidth to the second range interval R2, which is wider than the current range interval, the third range interval R3.

Step 104: When the average SNR value (V1) is less than the second critical SNR (R2), it is determined that the width of the filter bandwidth needs to be reduced. Therefore, the bandwidth adjustment signal is outputted to adjust the filter bandwidth to a range interval narrower than the current range interval. Take the five range intervals as an example. The filter bandwidth is in the third range interval R3, and is regarded as the current range interval. When the average SNR value (V1) is less than the second critical SNR (R2), the bandwidth adjustment signal is outputted to adjust the filter bandwidth to the fourth range interval R4, which is narrower than the current range interval, the third range interval R3.

Step 105: When the average SNR value (V1) is less than or equal to the first critical SNR (R1) and greater than or equal to the second critical SNR (R2), it is determined that the filter bandwidth does not need to be adjusted. That is, the bandwidth adjustment signal is not outputted.

In step 102, the average SNR value (V1) obtained from a plurality of the SNRs is compared with the first critical SNR (R1) and the second critical SNR (R2). It is also possible to compare the SNR with the first critical SNR (R1) and the second critical SNR (R2). When steps S103, S104, and S105 are completed, step S101 is processed again.

The SNR is the ratio of the signal power to the noise power. The intensity of the at least one radio signal relative to the noise signal in a period of time can be known by the average SNR value (V1). When the average SNR value (V1) is greater than the first critical SNR (R1), it means that the intensity of the at least one radio signal is higher than the noise signal. In other words, the noise in the at least one audio signal generated by the at least one radio signal is less obvious, so the filter bandwidth can be widened to make the at least one audio signal that is generated subsequently clearer and improve the listening quality of the user. When the average SNR value (V1) is less than the second critical SNR (R2), it means that the intensity of the at least one radio signal is close to the intensity of the noise signal. In other words, the noise in the at least one audio signal generated by the at least one radio signal is more obvious, and the noise may influence the at least one audio signal. Therefore, the range of the filter bandwidth can be narrowed to suppress the high-frequency noise in the at least one audio signal that is subsequently generated, and prevent high-frequency noise from interfering with the sound clarity.

To sum up, the radio 1 with automatic bandwidth adjusting functions presets multiple range intervals and uses the first critical SNR and the second critical SNR as a criterion to determine whether the filter bandwidth needs to be adjusted or not. When the radio signal is unstable, the filter bandwidth can be automatically adjusted to the appropriate range according to the comparison result of the average SNR value. The present invention overcomes the defect of manually adjusting bandwidth which affects the audio quality of the user's listening and causes inconvenience to the user.

What is claimed is:

1. A radio with automatic bandwidth adjusting functions, comprising:
   an antenna, receiving at least one radio signal;
   an audio processing module, electrically connected to the antenna, and presetting multiple range intervals, a filter bandwidth, a first critical signal-to-noise ratio (SNR), and a second critical SNR, wherein the range intervals are different, and the filter bandwidth is adjusted between the range intervals; and
   a player, electrically connected to the audio processing module;
   wherein the audio processing module filters the at least one radio signal according to the filter bandwidth, converts the filtered at least one radio signal into at least one audio signal, and generates at least one SNR information according to the at least one audio signal;
   wherein the player generates sound according to the at least one audio signal;
   wherein the audio processing module further compares the at least one SNR information with the first critical SNR and the second critical SNR to determine whether to adjust the filter bandwidth or not;
   wherein when the audio processing module determines the filter bandwidth needs to be adjusted, the audio processing module generates a bandwidth adjustment signal, and adjusts the filter bandwidth according to the bandwidth adjustment signal.

2. The radio with automatic bandwidth adjusting functions of claim 1, wherein the audio processing module comprises:
   a tuner, electrically connected to the antenna, and presetting the multiple range intervals and the filter bandwidth, wherein the tuner converts the at least one radio signal into the at least one audio signal, and generates the at least one SNR information according to the at least one audio signal; and
   a controller, electrically connected to the tuner, and presetting the first critical SNR and the second critical SNR, wherein the controller compares the at least one SNR information with the first critical SNR and the second critical SNR, and outputs the bandwidth adjustment signal to the tuner.

3. The radio with automatic bandwidth adjusting functions of claim 2, further comprising:
   a switch, connected to the controller of the audio processing module;
   wherein when the switch is turned on, the controller determines whether to adjust the filter bandwidth or not; and
   wherein when the switch is turned off, the controller stops determining whether to adjust the filter bandwidth or not.

4. The radio with automatic bandwidth adjusting functions of claim 2, further comprising:
   a monitor, connected to the controller;
   wherein the monitor displays a current range interval by an icon, a bandwidth value, or a light signal.

5. The radio with automatic bandwidth adjusting functions of claim 2, wherein the first critical SNR is greater than the second critical SNR; and
   wherein the controller obtains at least one SNR of the at least one audio signal according to the at least one SNR information, calculates an average SNR value of the at least one SNR, and compares the average SNR value with the first critical SNR and the second critical SNR.

6. The radio with automatic bandwidth adjusting functions of claim 5, wherein when the average SNR value is greater than the first critical SNR, the controller outputs the bandwidth adjustment signal to adjust the filter bandwidth to a range interval wider than a current range interval;
   wherein when the SNR average value is less than the second critical SNR, the controller outputs the bandwidth adjustment signal to adjust the filter bandwidth to a range interval narrower than the current range interval; and
   wherein when the SNR average value is less than or equal to the first critical SNR and greater than or equal to the second critical SNR, the controller stops outputting the bandwidth adjustment signal.

7. An automatic bandwidth adjusting method, comprising steps of:
- receiving at least one radio signal;
- converting the at least one radio signal in a preset filter bandwidth into at least one audio signal;
- generating at least one signal-to-noise ratio (SNR) information based on the at least one audio signal, wherein the filter bandwidth is adjusted between multiple preset range intervals, and the range intervals are different;
- comparing the at least one SNR information with a preset first critical SNR and a preset second critical SNR to determine whether to adjust the filter bandwidth or not;
- outputting a bandwidth adjustment signal when the filter bandwidth needs to be adjusted; and
- adjusting the filter bandwidth according to the bandwidth adjustment signal.

8. The automatic bandwidth adjusting method of claim 7, wherein the first critical SNR is greater than the second critical SNR; wherein the step of "comparing the at least one SNR information with a preset first critical SNR and a preset second critical SNR to determine whether to adjust the filter bandwidth or not" comprises sub-steps of:
- obtaining at least one SNR of the at least one audio signal according to the at least one SNR information;
- calculating an average SNR value of the at least one SNR; and
- comparing the average SNR value with the first critical SNR and the second critical SNR.

9. The automatic bandwidth adjusting method of claim 8, further comprising steps of:
- when the average SNR value is greater than the first critical SNR, outputting the bandwidth adjustment signal to adjust the filter bandwidth to a range interval wider than a current range interval;
- when the average SNR value is less than the second critical SNR, outputting the bandwidth adjustment signal to adjust the filter bandwidth to a range interval narrower than the current range interval;
- when the average SNR value is less than or equal to the first critical SNR and greater than or equal to the second critical SNR, stopping outputting the bandwidth adjustment signal.

10. The automatic bandwidth adjusting method of claim 7, wherein a current range interval corresponding to the filter bandwidth is shown by an icon, a bandwidth value of the range interval, or a light signal.

\* \* \* \* \*